US009172914B1

(12) United States Patent
Wheelock

(10) Patent No.: US 9,172,914 B1
(45) Date of Patent: Oct. 27, 2015

(54) USING EQAM VIDEO DE-JITTER MEMORY FOR PROCESSING M-CMTS DEPI PSP PRIORITY QUEUES

(75) Inventor: Ian G. Wheelock, Cork (IE)

(73) Assignee: ARRIS Enterprises, Inc., Suwanee, GA (US)

(*) Notice: Subject to any disclaimer, the term of this patent is extended or adjusted under 35 U.S.C. 154(b) by 920 days.

(21) Appl. No.: 13/018,464

(22) Filed: Feb. 1, 2011

(51) Int. Cl.
*H04N 7/173* (2011.01)
(52) U.S. Cl.
CPC .................. *H04N 7/17309* (2013.01)
(58) Field of Classification Search
CPC ........... H04L 12/2801; H04N 7/17309; H04N 21/42676
USPC .............................. 725/86–119; 709/217–232
See application file for complete search history.

(56) References Cited

U.S. PATENT DOCUMENTS

| | | | | |
|---|---|---|---|---|
| 5,640,388 A | * | 6/1997 | Woodhead et al. | 370/468 |
| 7,720,077 B1 | * | 5/2010 | Healy et al. | 370/395.62 |
| 8,428,063 B2 | * | 4/2013 | Salinger et al. | 370/392 |
| 8,468,572 B2 | * | 6/2013 | Liu et al. | 725/94 |
| 2004/0170199 A1 | * | 9/2004 | Golan et al. | 370/516 |
| 2005/0238061 A1 | * | 10/2005 | Woodward, Jr. | 370/516 |
| 2006/0083263 A1 | * | 4/2006 | Jagadeesan et al. | 370/487 |
| 2008/0159140 A1 | * | 7/2008 | Robinson et al. | 370/232 |
| 2010/0017833 A1 | * | 1/2010 | Abramson et al. | 725/111 |
| 2010/0083329 A1 | * | 4/2010 | Joyce et al. | 725/110 |

* cited by examiner

*Primary Examiner* — Annan Shang
(74) *Attorney, Agent, or Firm* — Troy A. Van Aacken

(57) ABSTRACT

Methods, systems, and apparatus can be used to repurpose MPEG-TS de-jitter memory for DEPI DOCSIS PSP priority queues processing.

13 Claims, 4 Drawing Sheets

USING EQAM VIDEO DE-JITTER MEMORY FOR PROCESSING M-CMTS DEPI PSP PRIORITY QUEUES

TECHNICAL FIELD

This disclosure relates to processing of information in network edge modulation devices.

BACKGROUND

The cable television network operators industry established and promulgated the data over cable system interface specification (DOCSIS) standard or protocol, including the DOCSIS 3.0 standard, to facilitate transporting data traffic, primarily Internet traffic, over existing community antenna television (CATV) networks. In addition to transporting data traffic, as well as television content signals over a CATV network, multiple services operators (MSO) also use their CATV network infrastructure for carrying voice, video on demand (VoD) and video conferencing traffic signals, among other types.

In general, DOCSIS specifies interface requirements for equipment involved in data distribution over cable television system networks. In a cable telecommunications system, video and data content can be digitized and then compressed according to one or more standards, for example MPEG, MPEG2, etc. The infrastructure for processing and delivering the content typically can include an access node, which may be, for example, a modular cable modem termination system (M-CMTS) that communicates with one or more user devices. Typically within the M-CMTS, the M-CMTS core communicates with an edge quadrature amplitude modulation (EQAM) device, which can receive incoming transport streams, process the content into an MPEG transport stream, and modulate the stream onto an RF carrier for delivery through an access network to a network element user device, which can be located in a subscriber's home.

The M-CMTS core can communicate with the EQAM via the DOCSIS data downstream external physical interface (DEPI), which is an IP tunnel interface that contains not only a data path for DOCSIS frames, but also a control path for the set-up, maintenance, and tearing down of sessions. DEPI uses as its base protocol the layer 2 tunneling protocol version 3, or L2TPv3 for short. L2TPv3 is an Internet Engineering Task Force (IETF) generic protocol for creating a "pseudowire," which serves as a mechanism that can transparently transport a layer 2 protocol over a layer 3 network.

The M-CMTS core converts packets it receives into DOCSIS compatible packets, which can then be encapsulated into DOCSIS MPEG transport (DOCSIS MPT) or DOCSIS packet streaming protocol (DOCSIS PSP) packets. In the case of MPT mode, multiple 188-byte MPEG2 transport stream (MPEG-TS) packets are transported in the L2TPv3 tunnel payload. In MPT mode, IP content is encapsulated into DOCSIS MAC frames and the DOCSIS MAC frames are encapsulated into MPEG-TS packets by the M-CMTS core. On the other hand, in PSP mode, raw DOCSIS frames are sent to the EQAM. The encapsulated packets are formatted according to the L2TPV3 protocol, and received by the EQAM.

The EQAM can receive the packets and extract the DOCSIS compatible packets (which may be video or data) within the DEPI payload and re-packetize the digital content into an MPEG-TS. It then uses QAM modulation to digitally modulate the digital transport stream onto a downstream RF carrier, which is sent via downstream RF interface (DRFI) to a user device.

For the processing of MPEG-TS packets, such as with the DOCSIS MPT mode, an EQAM device typically uses de-jitter buffer memory to buffer the transport stream so that any delay or congestion that was introduced in the transport stream is removed.

DEPI L2TPv3 PSP sessions are typically mapped 1:1 per QAM channel, and each session supports up to 8 separate priority queues, typically serviced on a strict priority de-queuing basis. When multiple priorities are used within a PSP session, the receiving device (normally an EQAM) will have to assign prioritized packet data to the configured priority queues, which are emptied (and processed for downstream transmission) on a strict priority de-queuing basis.

The EQAM can additionally be used to deliver video streams in MPEG-TS format to user devices, such as set top boxes. In this use, the EQAM can receive non-DOCSIS MPEG elementary streams that have been encapsulated in MPEG packets and placed in a user datagram protocol (UDP) message, a path that can by-pass the M-CMTS core processing.

Thus, the processing of the non-DOCSIS MPEG TS, DEPI DOCSIS MPT, and DEPI DOCSIS PSP by an EQAM can consume memory resources.

BRIEF DESCRIPTION OF THE DRAWINGS

Like reference numbers and designations in the various drawings indicate like elements.

DETAILED DESCRIPTION

In some implementations of this disclosure, methods can operate to repurpose EQAM video de-jitter memory for M-CMTS DEPI PSP session priority queues. In some examples, an edge device (e.g., an edge quadrature amplitude modulation (EQAM) device) can employ memory used for controlling video de jitter associated with video over MPEG-TS processing, and use, or repurpose, that de jitter memory for the processing of PSP priority queues.

Figure 1:
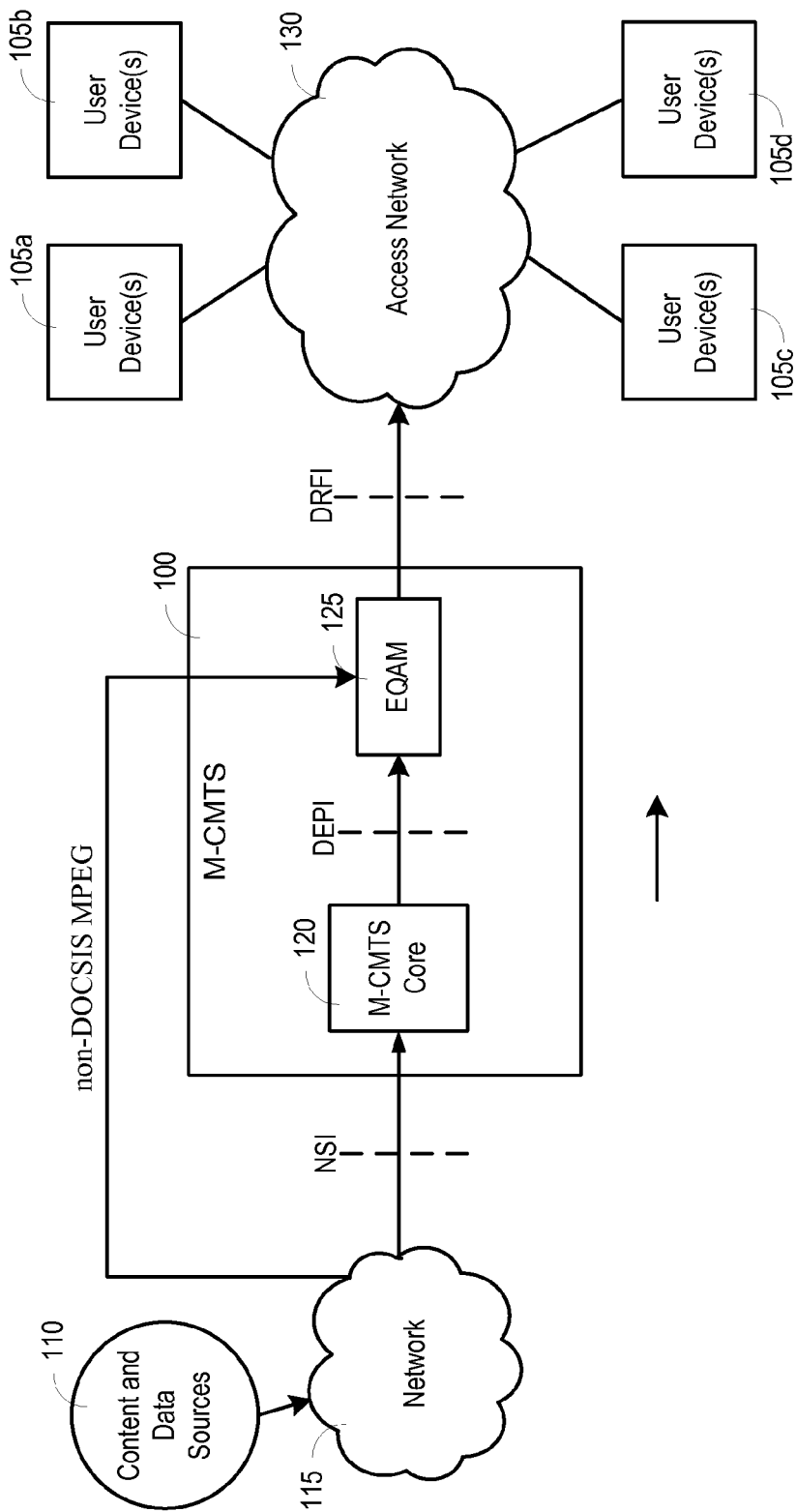
FIG. 1 is a block diagram illustrating an example implementation of M-CMTS networking environment.

FIG. 1 is a block diagram illustrating an exemplary network environment 100 operable to repurpose de jitter memory. In some implementations, a headend or local serving office having a modular cable modem termination system (M-CMTS) 100 can provide video, data and/or voice service(s) to one or more user devices 105a-d (e.g., cable modem(s), media terminal adapter(s) or MTA(s), gateway device(s) and/or set-top box(es)). The M-CMTS can include devices such as a modular cable modem termination system core (M-CMTS core) 120, and an edge quadrature amplitude modulation (EQAM) device (e.g., an edge QAM) 125. The M-CMTS Core 120 provides support for a multitude of services—including, but not limited to video over IP, voice-over-IP (VoIP), email, gaming, video telephony, etc. The EQAM 125 delivers video streams in MPEG-TS (Moving Picture Experts Group Transport Stream) format and digitally modulates the digital transport stream onto a downstream radio frequency (RF) carrier. This RF signal is then carried to user devices 105a-d, for example, via an access network 130.

Still referring to FIG. 1, content can be received from various content and data sources 110 connected through a network 115. The content and data sources 110 can be, for example, video on demand (VOD) servers, broadcast video servers, internet video sources, or any other source of content and data. The network 115 can be one or more networks, for example, a satellite network, backbone network, an Internet or IP network, an Ethernet network, a computer network, a web-based network, a wide area network, a local area network, a metropolitan area network, a regional network, a metro Ethernet network, or any other wired or wireless network or network system.

Still referring to FIG. 1, content and data can be transmitted from the content and data sources 110 through network 115 via a network side interface (NSI) to the M-CMTS 100. The NSI is the physical interface the M-CMTS 100 uses to connect to the area network 115. The NSI is typically a 100 Mbps or 1 Gbps Ethernet link, although a SONET/SDH or PDH interface, or any other high capacity data interface, can also be used. The M-CMTS Core 120 of the M-CMTS 100 receives Ethernet packets having content and/or data originating from content and data sources 110. Even though the M-CMTS Core 120 is described with reference to the DOCSIS standard, it may be applied to any communication protocol where packets from multiple channels and multiple priorities per channel are to be processed with a high bandwidth protocol engine followed by formatting into packets by a programmable header generator or protocol encapsulation engine. The M-CMTS 120 Core contains the downstream MAC and all the initialization and operational DOCSIS related firmware. This includes all signaling functions, downstream bandwidth scheduling, and DOCSIS framing.

Still referencing FIG. 1, the M-CMTS Core 120 converts these IP-based Ethernet packets into DOCSIS compatible packets. Thus, the M-CMTS Core 120 can provide support for a multitude of services—including, but not limited to video over IP, voice over IP (VoIP), email, gaming, video telephony, etc. The DOCSIS compatible packets can then be encapsulated using two tunneling techniques into DOCSIS MPEG transport (MPT) or a DOCSIS packet streaming protocol (PSP) packets. Typically, DOCSIS specifies that EQAM devices must support MPT mode, and may support PSP mode. These encapsulated packets travel via the downstream external physical interface (DEPI) to the EQAM 125. DEPI is an IP tunnel that exists between the M-CMTS Core 120 and the EQAM 125. The network (generally gigabit Ethernet) that connects an M-CMTS Core to an EQAM is typically referred to as the converged interconnect network (CIN). The role of DEPI is to allow for the transport of either formatted DOCSIS frames or MPEG packets through a layer 2 or layer 3 network and deliver them to the EQAM 125 for transmission. A base protocol typically used for DEPI is L2TPv3, which is a protocol for creating a pseudowire. As mentioned in the background, pseudowire serves as a mechanism that can transparently transport a layer 2 protocol over a layer 3 network. L2TPv3 supported protocols include, for example, ATM, HDLC, Ethernet, Frame Relay, PPP, etc.

Continuing with the description of FIG. 1, the M-CMTS Core 120 can encapsulate DOCSIS MAC Frames into MPEG-TS packets using the first tunneling technique, the D-MPT (or DOCSIS MPT) mode, which transports multiple 188-byte MPEG-TS packets by placing the packets into the L2TPv3 payload with a unique sub-header that contains a sequence number so packet drops can be detected. DOCSIS MPT mode is used so that MPEG packets can be received by the EQAM and forwarded directly to the RF interface without having to terminate and regenerate the MPEG framing. The only manipulation of the D-MPT payload is SYNC correction, which will be discussed below.

Referring to FIG. 1, a second technique can also be used, known as the packet streaming protocol (PSP) technique, which transports DOCSIS frames in the L2TPv3 payload via DEPI. In PSP mode, raw DOCSIS frames are sent to the EQAM 125, and it is the EQAM 125 that encapsulates DOCSIS frames in MPEG-TS packets.

The EQAM 125 typically can accommodate either or both MPT and PSP modes and receives the packets and extracts the DOCSIS compatible packets (which may be video or data) within the DEPI payload and re-packetizes the digital content into an MPEG transport stream (MPEG-TS). The EQAM 125 then uses QAM modulation to digitally modulate the digital transport stream onto a downstream RF carrier, which is sent via downstream RF interface (DRFI) to a user device.

As mentioned above, the EQAM 125 can be used to deliver video streams in MPEG-TS format to user devices, such as set top boxes. In this use, the EQAM 125 can receive non-DOCSIS MPEG elementary streams that have been encapsulated in MPEG packets and placed in a UDP datagram, a path that can bypass the M-CMTS Core 120 processing. For example, video-on-demand (VOD) transport can use VOD SPTS or MPTS streams that are received with a format of MPEG packets over UDP/IP. The video processing functions generally include de-jittering, re-multiplexing PID remapping, MPEG-2 PSI insertion, and PCR timestamp correction.

Figure 2:
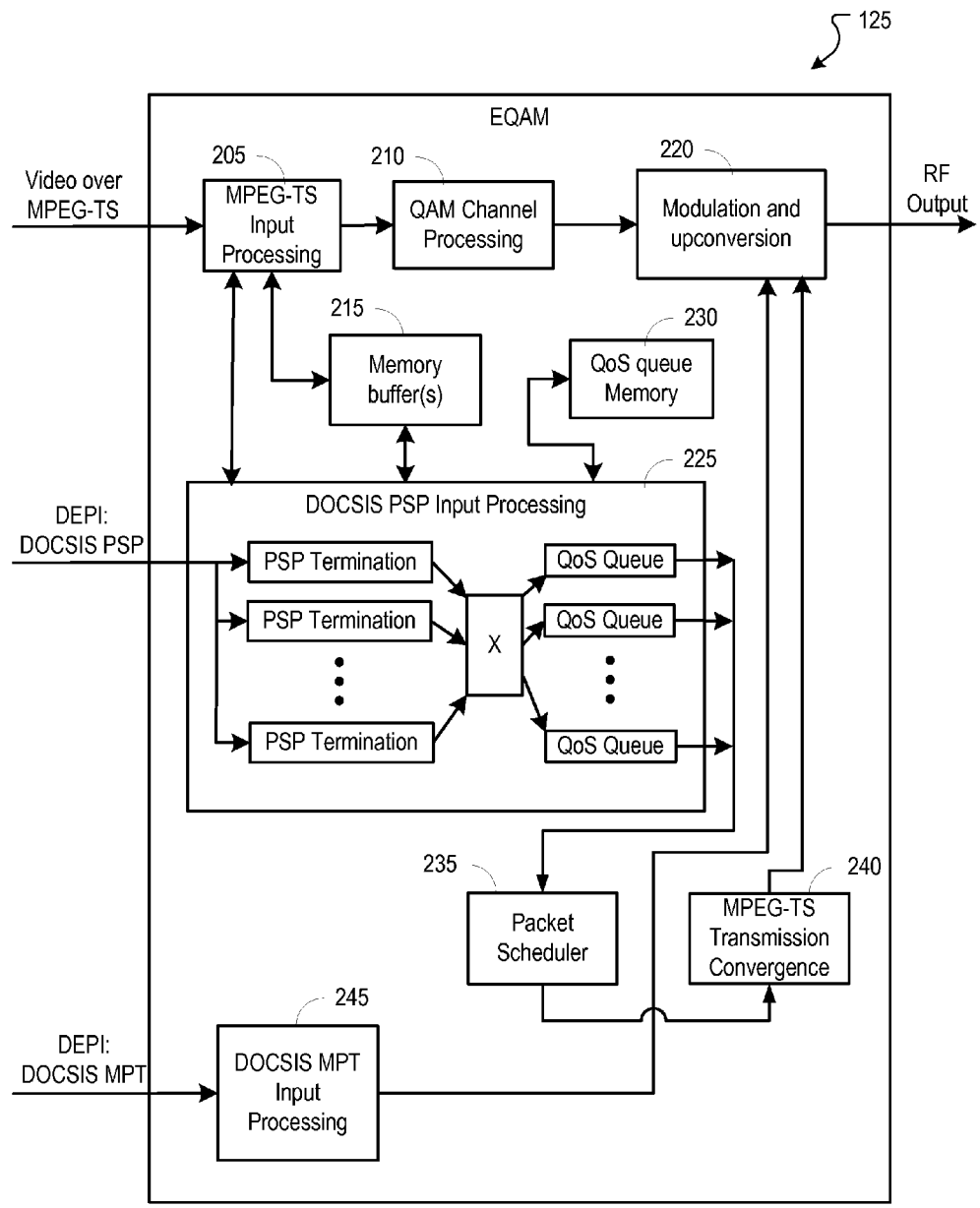
FIG. 2 is a block diagram illustrating an example implementation of an edge quadrature amplitude modulation device operable to process video over MPEG-TS and DEPI inputs.

FIG. 2 is a block diagram depicting certain aspects of the data path of an example EQAM in accordance with example implementations of this disclosure. Referring to FIG. 2, an example implementation of an EQAM (e.g., EQAM 125 of FIG. 1), can support one or more incoming non-DOCSIS video over MPEG transport streams encapsulated in UDP/IP/Ethernet. The video over MPEG-TS can arrive at the EQAM at MPEG-TS via one or more input interfaces (not shown) through which configuration messages, resource management traffic, and network management information travel. The input interfaces feed MPEG-TS input processing block(s) 205. MPEG-TS input processing block 205 can control the de-multiplexing of individual transport streams (based on UDP destination port number or IP multicast address information) from the input interface, provide de-jittering of those transport streams, and route them to the appropriate QAM channel processing block(s) 210.

Typically, jitter can be attributed to variability in the inter-packet arrival interval on the input interfaces, resulting in buffer overrun or underrun in the signal passed to the subscriber. To facilitate the de-jittering function performed by MPEG-TS input processing block 205 on the input transport streams, one or more memory buffer(s) 215 (e.g., a de-jitter buffer) can be associated with the MPEG-TS input processing block(s) 205 which can use the memory buffer 215 to operate to buffer incoming data to avoid jitter. In some implementations, the buffer can be a circular de-jitter buffer operable to provide a circular queue for processing the video signal.

Looking at FIG. 2, one or more processors, such as QAM channel processing block(s) 210, can control the generation of an output MPTS for a single QAM channel. The QAM channel processing blocks 210 can operate in more than one mode. For example, the QAM channel processing blocks 210 can operate in passthrough mode. In passthrough mode, one or more of the QAM channel processing blocks 210 can take a single MPEG-TS from the input TS processing block, perform minimal processing, and forward it the QAM channel for modulation and transmission. On the other hand, the QAM channel processing blocks 210 can also operate in a multiplexing mode, in which case these blocks 210 can take a number of input transport streams (single program transport stream (SPTS) and/or multiple program transport stream (MPTS)), select certain programs from those inputs, perform program number remapping and packet identifier (PID) remapping, generate PSI information, and multiplex the selected programs into an output MPTS, which is then forwarded to the modulation and upconversion block(s) 220.

In some implementations, modulation and upconversion block(s) 220 can be configured to modulate the data streams into channels (e.g., RF channels described by the DOCSIS specification, CDMA channels, TDMA channels, or any other multiple access protocol). The modulation and upconversion block 220 can also modulate one or more RF channels onto a carrier signal. In some implementations, the modulation and upconversion block(s) 220 can modulate many RF channels onto a single carrier signal for transmission across an access network to one or more user devices. Modulation techniques include, but are not limited to, quadrature phase shift keying (QPSK), differential quadrature phase shift keying (DQPSK), frequency shift keying (FSK), minimum shift keying (MSK), quadrature amplitude modulation (QAM) and differential quadrature amplitude modulation (DQAM).

In FIG. 2, an EQAM (e.g., EQAM 125 of FIG. 1), can also accommodate DEPI DOCSIS PSP and DEPI DOCSIS MPT streams. The packet stream protocol (PSP) is typically a layer-3 convergence layer protocol, which allows packets to be consecutively streamed together and fragmented at arbitrary boundaries. PSP mode can facilitate Quality of Service. On the other hand, because D-MPT mode encapsulates all DOCSIS traffic into a single DEPI flow, it does not allow for QoS differentiation among various types of traffic either across the CIN or within the EQAM. The DEPI DOCSIS PSP can input into the EQAM and be processed by one or more processors having one or more software modules, for example DOCSIS PSP input processing block 225. The DOCSIS PSP input processing block 225 can be operative to process the DEPI DOCSIS PSP input by terminating the PSP flow/stream, and extracting the DOCSIS frames within the flow. The input processing block 225 can also be operative to place the DOCSIS frames into one or more corresponding output QoS queues. This termination and extraction process is illustrated in FIG. 2.

Still referring to FIG. 2, one or more memories, which can be processor memory, flash memory, or any other type of memory, can be used to process the QoS queues. In FIG. 2, such a memory is shown as QoS queue memory 230.

The output of the QoS queues can move out of QoS queue memory 230 to a packet scheduler 235 that can apply priorities to different queues as packets are moved from different input queues to the output queue. An example of a typical packet scheduling algorithm would be weighted fair queuing (WFQ) in which some streams are given priority over other streams, but only up to a limit. The packet scheduler 235 can support a strict priority scheduler, and can also support other queue scheduling disciplines. The output of packet scheduler 235 can go to a transmission convergence block 240, which can place the DOCSIS frames into MPEG packets according to the requirements in the DOCSIS downstream radio frequency interface (DRFI) specification. This can include the insertion of stuffing bytes and the DOCSIS SYNC message. The output of transmission convergence block 240 can be sent to the modulation and upconversion block 220.

DEPI DOCSIS D-MPT flows containing DOCSIS frames can also be processed by an EQAM (e.g., EQAM 125 of FIG. 1). All DOCSIS frames, including packet based frames and MAC management based frames, can be included within the one D-MPT flow. The DEPI DOCSIS MPT flow can be processed by DOCSIS MPT input processing block 245. The DOCSIS MPT input processing block can perform searches of the D-MPT payload for any DOCSIS SYNC messages and perform SYNC corrections. The DOCSIS MPT input processing block can then forward the D-MPT packet to the modulation and upconversion block 220. As mentioned above, D-MPT mode allows MPEG packets to be received by the EQAM and forwarded directly to the RF interface without having to terminate and regenerate the MPEG framing.

As mentioned above, when video over MPEG-TS streams are sent by the EQAM over RF, the EQAM typically operates to eliminate any delay or congestion introduced in the SPTS (de-jittering). Streams can be buffered so that the EQAM can play out the streams at the correct rate to the RF channel, which is a synchronous transport. As a result EQAMs can contain memory storage, for example memory buffers 215, to buffer the MPEG-2 TS streams before transmission. In some cases EQAMs can have large de jitter capabilities (e.g., 100 ms or 250 ms of de-jittering capability). Each millisecond of de-jittering corresponds to a specific amount of memory, based on the transmission rate of the MPEG-2 TS streams. For example, 100 ms of de jitter buffer for a 4 Mbps stream is typically interpreted as +100 ms and −100 ms of de-jittering, or a total of 200 ms of buffering space at 4 Mbps. This correlates to 0.200 secs*4,000,000 bit/sec or 100 Kbytes of storage. Typically, EQAMs can support 10 MPEG2-TS streams (or more) per QAM channel, resulting in 1 Mbyte of de-jitter storage (at 100 ms de-jittering) per QAM channel.

In some implementations of the present disclosure, when adding PSP support to EQAMs, the existing buffer memory (e.g., memory buffers 215 in FIG. 2) used for de-jittering can be used or repurposed as memory for handling L2TPv3 PSP priority queues (QoS queues). If sufficient program de-jittering memory is available per MPEG-2 TS flow, then a basic mapping of priority queue to program de-jitter memory can be made. Alternatively, the existing memory can be completely repurposed and used for deep priority queues (up to 8, for example) to support incoming PSP sessions per QAM channels.

Thus, in some implementations, the EQAM is operative to receiving an MPEG transport stream, and a DEPI DOCSIS PSP stream. A first portion of a memory (e.g., memory buffers 215 in FIG. 2) can be used to de-jitter the MPEG transport stream, and a second portion of the memory can be used for processing PSP priority queues associated with the DEPI DOCSIS PSP stream. A determination can be made as to whether any portion of the memory used to de jitter the MPEG transport stream remains unused. The second portion of the memory can be the remaining portion of the memory that was not used to de-jitter the MPEG transport stream. The second portion can be increased in response to decreased jitter on the MPEG transport stream, and the second portion can also be reduced in response to increased jitter on the MPEG transport stream.

In some implementations, the first portion can be a fixed portion, such that a specific amount of memory has been allocated for de jitter the MPEG transport stream.

Some MPEG2-TS de-jitter memory buffers can be preserved for joint transmission of MPEG-2 TS streams and the DOCSIS downstream to the relevant QAM channels.

Figure 3:
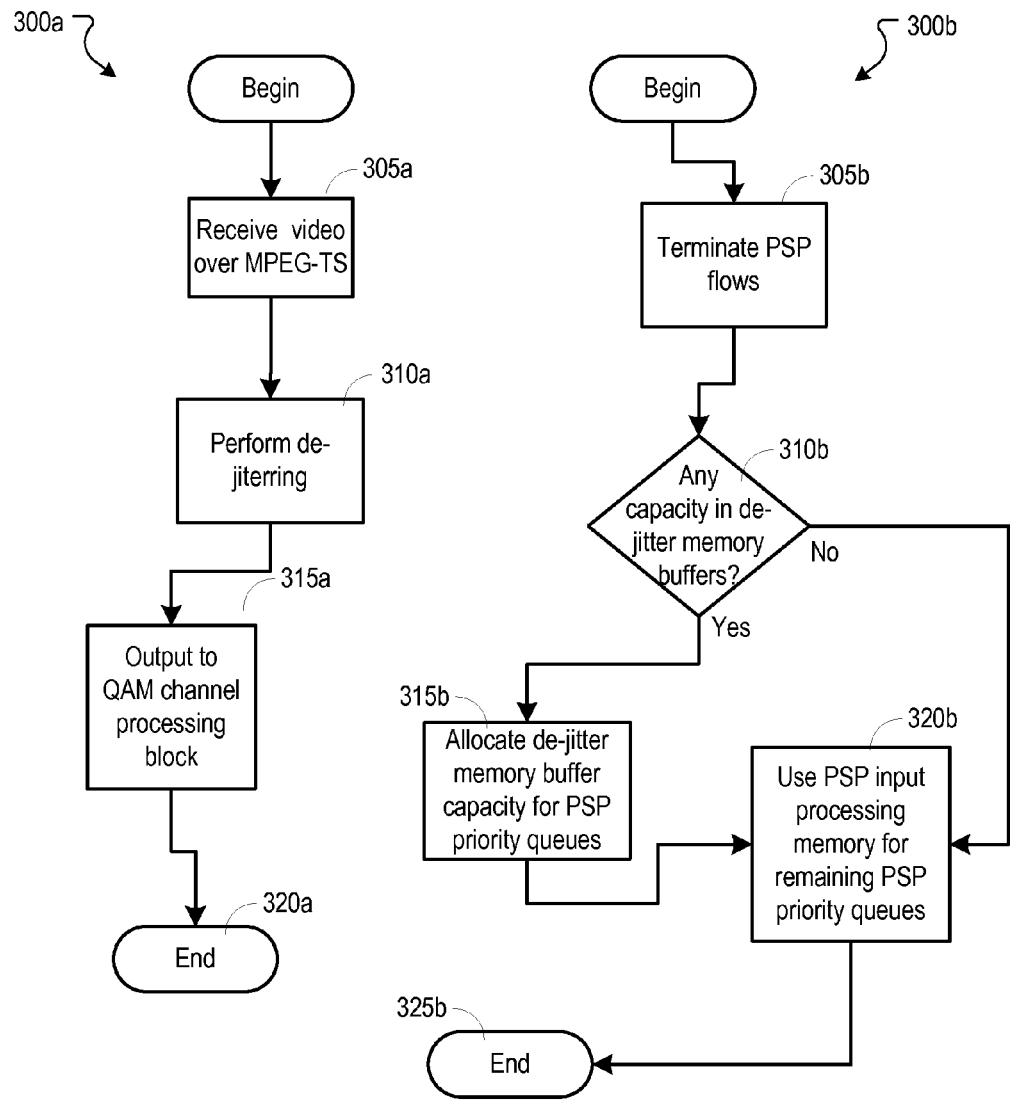
FIG. 3 is a flow diagram illustrating an example process for repurposing de jitter memory for QoS Queue processing.

FIG. 3 is a flow diagram illustrating example processes 300a and 300b performed by one or more processors within an exemplary EQAM device (e.g., EQAM 125 of FIG. 1 and/or FIG. 2), resulting in the use of de-jitter memory buffers for PSP priority queues. At stage 305a, one or more video over MPEG-TS streams are received. The video over MPEG-TS streams can be received, for example, by one or more input interfaces that feed an MPEG-TS input processing block (e.g., MPEG-TS input processing block 205 of FIG. 2). At stage 310a, a de-jittering function can be performed to buffer incoming video over MPEG-TS data to avoid jitter. The de-jittering function can be performed, for example, by an MPEG-TS input processing block (e.g., MPEG-TS input processing block 205), wherein one or more memory buffers (e.g., memory buffer(s) 215 of FIG. 2) can be associated with the MPEG-TS input processing block (e.g., MPEG-TS input processing block 225 of FIG. 2) to facilitate the de jitter function. At stage 315a, the output can be sent for further processing. The further processing performed can include the functions performed by a QAM channel processing block (e.g., QAM channel processing block 210 of FIG. 2), as described above. Additional processing can occur, but the example process 300a of FIG. 3 need not be described further and the flow chart for example process 300a can end at block 320a.

At stage 305b, a DEPI DOCSIS PSP stream can be received into the EQAM and be processed by one or more processors having software modules (e.g., DOCSIS PSP input processing block 225 of FIG. 2). At stage 305b, the PSP flow can be terminated and the DOCSIS frames within the flow extracted by an input processing block (e.g., DOCSIS PSP input processing block 225).

At stage 310b, the capacity of de-jitter memory buffers associated with video over MPEG-TS de-jitter control, for example, a memory buffer (e.g., memory buffer 215 of FIG. 2), can be checked to determine the memory buffer capacity. This capacity might be full, or partially full due to the use of the memory buffer for MPEG-TS de-jittering by, for example, an input processing block (e.g., MPEG-TS input processing block 205 of FIG. 2) during stage 310a of process 300a. If it is determined at stage 310b that there is excess/spare capacity (e.g., some unused portion) in the de jitter memory buffer, then at stage 315b that excess/spare capacity can be used or repurposed to accommodate PSP output priority queue processing. The determination of queue availability and repurposing can be made by, for example, an input processing block (e.g., DOCSIS PSP input processing block 225 of FIG. 2).

At stage 320b, any remaining QoS output queues can be processed using a memory that can be associated with the DOCSIS PSP input processing block. Such memory can be, for example, one or more QoS queue memories (e.g., QoS queue memories 230 of FIG. 2). If it is determined at stage 310b that there is no excess capacity in the de jitter memory buffer, then at stage 320b all of the QoS output queue processing can use one or more QoS queue memories associated with DOCSIS PSP input processing block. Further processing can occur, but the example process 300b of FIG. 3 need not be described further and the flow chart can end at block 325b.

In some implementations, PSP input processing memory/memories can be used for PSP priority queue processing, and if any capacity in de jitter memory buffer(s) used for MPEG-TS processing (e.g., block 215 of FIG. 2) remains available, then the de-jitter memory buffer(s) can be used for PSP priority queue processing. In some implementations, a portion, for example a specific capacity or amount, of de-jitter memory buffer that was intended to be used for MPEG-TS processing can be allocated for PSP priority queue processing, including any overflow processing.

Figure 4:
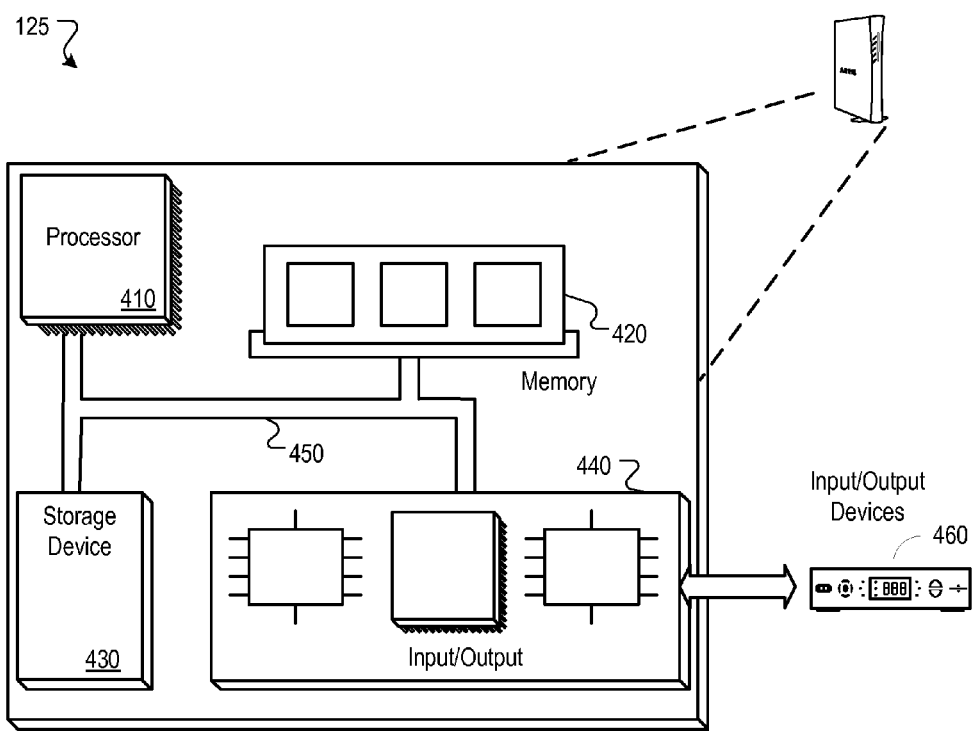
FIG. 4 is a block diagram illustrating an example edge quadrature amplitude modulation device operable for repurposing de jitter memory for QoS Queue processing.

FIG. 4 is a block diagram of an example edge termination device operable to repurpose de-jitter memory buffers to accommodate QoS queue outputs. The edge termination device 400 can include one or more of a processor 410, a memory 420, a storage device 430, and an input/output device 440. Each of the components 410, 420, 430, and 440 can, for example, be interconnected using a system bus 450. The processor 410 is capable of processing instructions for execution within the system 400. In one implementation, the processor 410 can be a single-threaded processor. In another implementation, the processor 410 can be a multi-threaded processor. The processor 410 is capable of processing instructions stored in the memory 420 or on the storage device 430.

The memory 420 stores information within the device 400. In one implementation, the memory 420 can be a computer-readable medium. In one implementation, the memory 420 can be a volatile memory unit. In another implementation, the memory 420 can be a non-volatile memory unit.

In some implementations, the storage device 430 is capable of providing mass storage for the device 400. In one implementation, the storage device 430 can be a computer-readable medium. In various different implementations, the storage device 430 can, for example, include a hard disk device, an optical disk device, flash memory or some other large capacity storage device.

The input/output device 440 provides input/output operations for the device 400. In one implementation, the input/output device 440 can include one or more of a plain old telephone interface (e.g., an RJ11 connector), a network interface device, e.g., an Ethernet card, a serial communication device, e.g., and RS-232 port, and/or a wireless interface device, e.g., and 802.11 card. In another implementation, the input/output device can include driver devices configured to receive input data and send output data to other input/output devices 460, such as one or more subscriber devices (e.g., set top box, cable modem, etc.), as well as sending communications to, and receiving communications from a network. Other implementations, however, can also be used, such as mobile computing devices, mobile communication devices, set-top box television client devices, etc.

The edge termination device (e.g., M-CMTS, EQAM, etc., or any combination thereof) of this disclosure, and components thereof, can be realized by instructions that upon execution cause one or more processing devices to carry out the processes and functions described above. Such instructions can, for example, comprise interpreted instructions, such as script instructions, e.g., JavaScript or ECMAScript instructions, or executable code, or other instructions stored in a computer readable medium.

Implementations of the subject matter and the functional operations described in this specification can be provided in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus. The tangible program carrier can be a propagated signal or a computer readable medium. The propagated signal is an artificially generated signal, e.g., a machine generated electrical, optical, or electromagnetic signal that is generated to encode information for transmission to suitable receiver apparatus for execution by a computer. The computer readable medium can be a machine readable storage device, a machine readable storage substrate, a memory device, a composition of matter effecting a machine readable propagated signal, or a combination of one or more of them.

The term "processor" or "processing block" encompasses all apparatus, devices, and machines for processing data, including by way of example a programmable processor, a computer, or multiple processors or computers. The system processor can include, in addition to hardware, code that creates an execution environment for the computer program in question, e.g., code that constitutes processor firmware, a protocol stack, a database management system, an operating system, or a combination of one or more of them.

A computer program (also known as a program, software, software application, module, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification are performed by one or more programmable processors executing one or more computer programs to perform functions by operating on input data and generating output thereby tying the process to a particular machine (e.g., a machine programmed to perform the processes described herein). The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The elements of a computer typically include a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile communications device, a telephone, a cable modem, a set-top box, a mobile audio or video player, or a game console, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD ROM disks. The processor and the memory can be supplemented by, or incorporated in, special purpose logic circuitry.

To provide for interaction with a user, embodiments of the subject matter described in this specification can be operable to interface with a computing device having a display, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results, unless expressly noted otherwise. As one example, the processes depicted in the accompanying figures do not necessarily require the particular order shown, or sequential order, to achieve desirable results. In some implementations, multitasking and parallel processing may be advantageous.

What is claimed is:

1. A method performed in an edge quadrature amplitude modulation device comprising:
   receiving an MPEG transport stream at the edge quadrature amplitude modulation device;
   receiving a DEPI DOCSIS PSP stream at the edge quadrature amplitude modulation device;
   using a first portion of an MPEG de-jitter memory buffer to de-jitter the MPEG transport stream; and
   using a second portion of the MPEG de-jitter memory buffer for processing PSP priority queues associated with the DEPI DOCSIS PSP stream, wherein the second portion of the MPEG de-jitter memory buffer comprises a remaining portion of the MPEG de-jitter memory buffer that is not used by the first portion of the MPEG de-jitter memory buffer to de-litter the MPEG transport stream.

2. The method of claim 1, wherein the first portion of the MPEG de-jitter memory buffer is a fixed portion.

3. The method of claim 1, wherein the second portion is increased in response to decreased jitter on the MPEG transport stream.

4. The method of claim 1, wherein the second portion is reduced in response to increased jitter on the MPEG transport stream.

5. The method of claim 1, wherein the MPEG de-jitter memory buffer is used to control the de-multiplexing of individual transport streams.

6. The method of claim 1, wherein the processing of PSP priority queues comprises extracting the DOCSIS frames within the DEPI DOCSIS PSP stream and placing the DOCSIS frames into an output QoS queue.

7. The method of claim 1, further comprising:
   using a PSP processing memory buffer associated with the processing of DEPI DOCSIS PSP streams for any remaining processing of PSP priority queues associated with the DEPI DOCSIS PSP stream.

8. A method performed in an edge quadrature amplitude modulation device comprising:
   receiving an MPEG transport stream at the edge quadrature amplitude modulation device;
   using an MPEG de-jitter memory buffer to de-jitter the MPEG transport stream;
   receiving a DEPI DOCSIS PSP stream at the edge quadrature amplitude modulation device;
   determining whether any portion of the MPEG de-jitter memory buffer used to de-jitter the MPEG transport stream remains unused; and
   using the unused portion of the MPEG de-jitter memory buffer to process PSP priority queues associated with the DEPI DOCSIS PSP stream.

9. The method of claim 8, wherein the determination whether any portion of the MPEG de-litter memory buffer remains unused is based on decreased jitter on the MPEG transport stream.

10. The method of claim 8, wherein the determination whether any portion of the MPEG de-jitter memory buffer remains unused is based on increased jitter on the MPEG transport stream.

11. The method of claim 8, wherein the MPEG de-jitter memory buffer is used to control the de-multiplexing of individual transport streams.

12. The method of claim 8, wherein the processing of PSP priority queues comprises extracting the DOCSIS frames within the DEPI DOCSIS PSP stream and placing the DOCSIS frames into an output QoS queue.

13. The method of claim 8, further comprising:
   using a PSP processing memory buffer associated with the processing of DEPI DOCSIS PSP streams for any remaining processing of PSP priority queues associated with the DEPI DOCSIS PSP stream.

* * * * *